(12) United States Patent
Hosokawa

(10) Patent No.: US 9,208,411 B2
(45) Date of Patent: Dec. 8, 2015

(54) PRINT CONTROLLING APPARATUS, PRINT CONTROLLING METHOD AND STORAGE MEDIUM

(71) Applicant: CANON KABUSHIKI KAISHA, Tokyo (JP)

(72) Inventor: Yoshiyuki Hosokawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/602,097

(22) Filed: Jan. 21, 2015

(65) Prior Publication Data

US 2015/0220818 A1 Aug. 6, 2015

(30) Foreign Application Priority Data

Feb. 4, 2014 (JP) .................. 2014-019766

(51) Int. Cl.
*G06F 3/12* (2006.01)
*G06K 15/02* (2006.01)
*G06K 15/00* (2006.01)

(52) U.S. Cl.
CPC ............ *G06K 15/021* (2013.01); *G06F 3/1205* (2013.01); *G06F 3/1219* (2013.01); *G06F 3/1258* (2013.01); *G06F 3/1259* (2013.01); *G06F 3/1267* (2013.01); *G06K 15/005* (2013.01); *G06K 15/4065* (2013.01)

(58) Field of Classification Search
CPC ... G06F 3/1285; G06F 3/1211; G06F 3/1259; G06F 3/1273; G06F 21/608; G06F 3/1228; G06F 3/1232; G06F 3/1243; G06F 3/1286; G06F 3/1288; G06F 3/1229; G07F 11/002; G07F 17/0092; G07F 19/00
USPC ......... 358/1.15, 1.14, 1.6, 498; 399/322, 388, 399/40, 69, 81
See application file for complete search history.

(56) References Cited

U.S. PATENT DOCUMENTS

| | | | | |
|---|---|---|---|---|
| 6,301,013 B1 * | 10/2001 | Momose et al. | ............ | 358/1.15 |
| 7,630,095 B2 | 12/2009 | Tarumi | | |
| 2004/0264993 A1 * | 12/2004 | Konuma et al. | .................. | 399/81 |
| 2005/0180791 A1 * | 8/2005 | Kujirai | ........................... | 400/61 |
| 2005/0200075 A1 * | 9/2005 | Speller | ......................... | 271/279 |
| 2008/0003011 A1 * | 1/2008 | Unno | ............................. | 399/82 |
| 2013/0208314 A1 * | 8/2013 | Yamada | ...................... | 358/1.15 |
| 2013/0329256 A1 * | 12/2013 | Fukuda | ....................... | 358/1.15 |
| 2014/0055815 A1 * | 2/2014 | Gabe | ............................ | 358/1.15 |
| 2014/0092399 A1 * | 4/2014 | Sawada | ......................... | 358/1.2 |

FOREIGN PATENT DOCUMENTS

JP 2006-289735 A 10/2006

* cited by examiner

*Primary Examiner* — Negussie Worku
(74) *Attorney, Agent, or Firm* — Fitzpatrick, Cella, Harper & Scinto

(57) ABSTRACT

A paper attribute designated by a suspended job which has been stored in a print job queue and printing of which has not been executed is acquired. When executing replacement of paper supplied to the printing apparatus is executed, a screen in which a user can designate a paper attribute candidate after paper replacement is displayed so that the acquired paper attribute is preferentially displayed out of candidates which the user can select as the paper attribute candidate. An image is printed on printing paper after the replacement, based on a paper attribute designated by the user in the screen.

21 Claims, 8 Drawing Sheets

F I G. 5

| INPUT ORDER | JOB NAME | PAPER TYPE | OWNER | STATUS | INPUT TIME |
|---|---|---|---|---|---|
| 1 | Job1 | MAT PAPER | PC110 | SUSPENDED | 10:00 |
| 2 | Job2 | PLAIN PAPER | PC110 | SUSPENDED | 13:00 |
| 3 | Job3 | GLOSSY PAPER (THIN) | PC110 | SUSPENDED | 14:00 |
| 4 | Job4 | COATED PAPER (THICK) | PC120 | SUSPENDED | 17:00 |

PRINT CONTROLLING APPARATUS, PRINT CONTROLLING METHOD AND STORAGE MEDIUM

BACKGROUND OF THE INVENTION

1. Field of the Invention

The present invention relates to a print controlling apparatus and print controlling method for controlling a printing apparatus, and a non-transitory computer-readable storage medium storing a program.

2. Description of the Related Art

To obtain a proper printing result by using a printer, a paper type set in a job to be printed by a user and the type of paper currently fed to the printer need to match each other. As an example in which these paper types do not match each other (mismatch), for example, when performing printing on plain paper though a paper type set by a print setting is glossy paper, ink may be excessively discharged and no expected printing result may be obtained. Especially in the case of a large-format printer, paper to be used is expensive, the printing area is often large, and a large amount of ink is consumed despite a mismatch. To prevent such a paper type mismatch, when the paper type of a job to be printed and a paper type set in advance in a printer do not match each other, there is known a function of temporarily halting a job to be printed, or a function of temporarily suspending a job and then printing it. When executing again a temporarily halted job or a temporarily suspended job, the user replaces a paper cassette in order to supply paper of a new type.

Japanese Patent Laid-Open No. 2006-289735 discloses a method of, when a printer capable of printing corresponding to each of a plurality of paper characteristics is to perform printing corresponding to a type of paper not set in the printer, recognizing a type of paper that is set in the printer and used last for printing, and specifying the paper as a replacement target.

In the above, paper to replace paper already set in the printing apparatus is specified in a state in which a paper type after replacement has already been uniquely decided. To decide a paper type after replacement, for example, the user needs to select a paper type after replacement from a plurality of paper types.

Particularly in the case of a large-format printer, there are many types (for example, several ten types) of printable paper. To select a paper type the user wants, he needs to search a list on the panel for paper to be actually fed and select the paper. This puts a burden on the user. The same problem sometimes occurs not only in the large-format printer, but also in a printer that can print on relatively small-size paper such as paper of a postcard size or L-size.

SUMMARY OF THE INVENTION

An aspect of the present invention is to eliminate the above-mentioned problems with the conventional technology. The present invention provides a print controlling apparatus and print controlling method capable of appropriately specifying a paper type after paper replacement, and a storage medium storing a program.

The present invention in one aspect provides a print controlling apparatus that controls a printing apparatus capable of executing printing corresponding to each of a plurality of types of attributes of printing paper, comprising: an acquisition unit configured to acquire a paper attribute designated by a suspended job which has been stored in a print job queue and printing of which has not been executed; a display controlling unit configured to, in a case where executing replacement of paper supplied to the printing apparatus is executed, control a display unit to display a screen in which a user can designate a paper attribute candidate after paper replacement, so that the paper attribute acquired by the acquisition unit is preferentially displayed out of candidates which the user can select as the paper attribute candidate; and a print controlling unit configured to control the printing apparatus to print an image on printing paper after the replacement, based on a paper attribute designated by the user in the screen displayed by the display controlling unit.

According to the present invention, a paper type after paper replacement can be appropriately specified.

Further features of the present invention will become apparent from the following description of exemplary embodiments with reference to the attached drawings.

BRIEF DESCRIPTION OF THE DRAWINGS

FIG. 5 is a table showing a list of print jobs stored in a print job queue;

DESCRIPTION OF THE EMBODIMENTS

Figure 1:
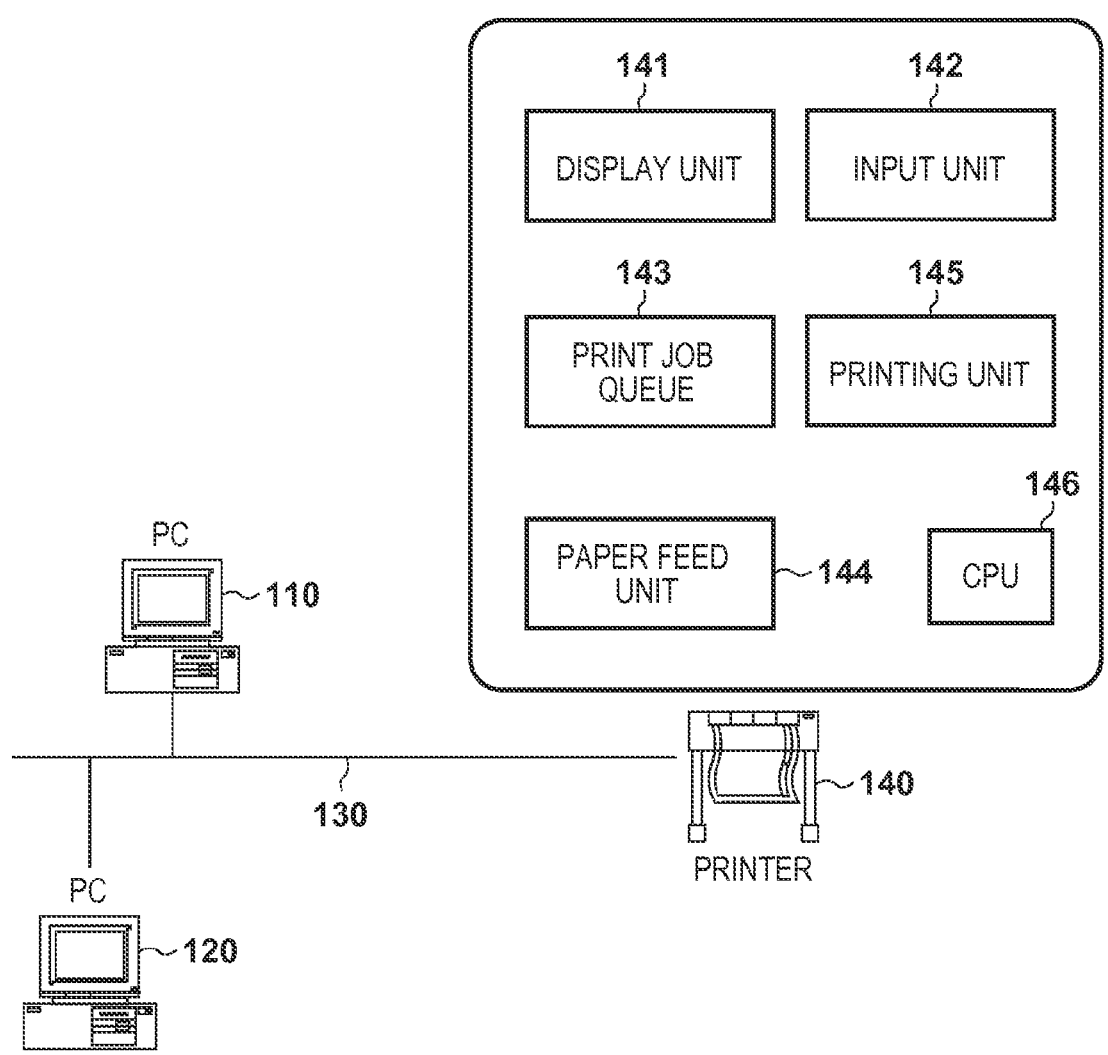
FIG. 1 is a view showing the arrangement of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a description thereof will not be repeated.

FIG. 1 is a view showing the arrangement of a printing system according to an embodiment of the present invention. A printing system 100 includes PCs 110 and 120, and a printing apparatus 140. The PCs 110 and 120 and the printing apparatus 140 are connected to be able to communicate with each other via a network 130. The network 130 is, for example, a wired or wireless LAN. Alternatively, the printing apparatus 140 may be connected to the PCs 110 and 120 via dedicated cables.

The printing apparatus 140 is a large-format printer capable of executing printing on, for example, A2-size roll paper. The printing apparatus 140 is configured to be able to supply a plurality of types of printing paper (printing media) such as plain paper and glossy paper to a paper feed unit. Note that the printing apparatus in this embodiment may be a printer that prints on a cut sheet such as an A4-size sheet or an L-size sheet. The PCs 110 and 120 are, for example, general-purpose PCs in which printer drivers are installed, and operate as print controlling apparatuses capable of transmitting a print job and image data to be printed to the printing apparatus 140 via the network 130.

The printing apparatus 140 roughly includes, as internal components, a display unit 141, an input unit 142, a print job queue 143, a paper feed unit 144, and a printing unit 145. The display unit 141 is, for example, a display or a panel, displays the print processing status and power-on/off state of the printing apparatus 140, and displays a setting screen capable of accepting various print settings. In this embodiment, the display unit 141 displays a paper selection screen when replacing paper in the paper feed unit 144. The input unit 142 includes hardware keys and the like capable of respective execution instructions, such as a vertical scroll key and a selection button, in order to perform a setting operation by a user on the setting screen of the display unit 141.

A CPU 146 is a controlling unit for controlling the printing apparatus 140. The CPU 146 can control each unit of the printing apparatus 140 by executing, on a RAM (not shown), a control program stored in a ROM (not shown).

The print job queue 143 is, for example, a storage area in the RAM or the ROM, and is a storage unit that stores print jobs received and acquired from the PCs 110 and 120 on standby for execution of printing. Note that the print job includes data to be printed in printing of the print job, and information representing a paper type as a print setting in the printing. The CPU 146 controls the display unit 141 to display a list of print jobs stored in the print job queue 143. The paper feed unit 144 stores printing paper such as roll paper, and supplies it to the printing unit 145. The paper feed unit 144 includes a conveyance path and various rollers for conveying printing paper, and a cutter for cutting roll paper in a predetermined region unit. The printing unit 145 executes print jobs stored in the print job queue 143 sequentially in the acquisition order or priority order of the print jobs, and prints on printing paper fed from the paper feed unit 144. When the printing unit 145 complies with an inkjet printing method, it includes a printhead and a carriage.

Supply of printing paper by the paper feed unit 144 and printing by the printing unit 145 are executed under the control of the CPU 146. For example, when executing a print job stored in the print job queue 143, the CPU 146 controls the paper feed operation of the paper feed unit 144, movement of the carriage supporting the printhead, the discharge operation of printed printing paper, and the like. When the printing apparatus 140 is an inkjet printing apparatus, printing is executed by discharging ink droplets of cyan (C), magenta (M), yellow (Y), and black (K) onto printing paper. The CPU 146 also controls these ink droplet discharge timings and the like.

Figure 2:
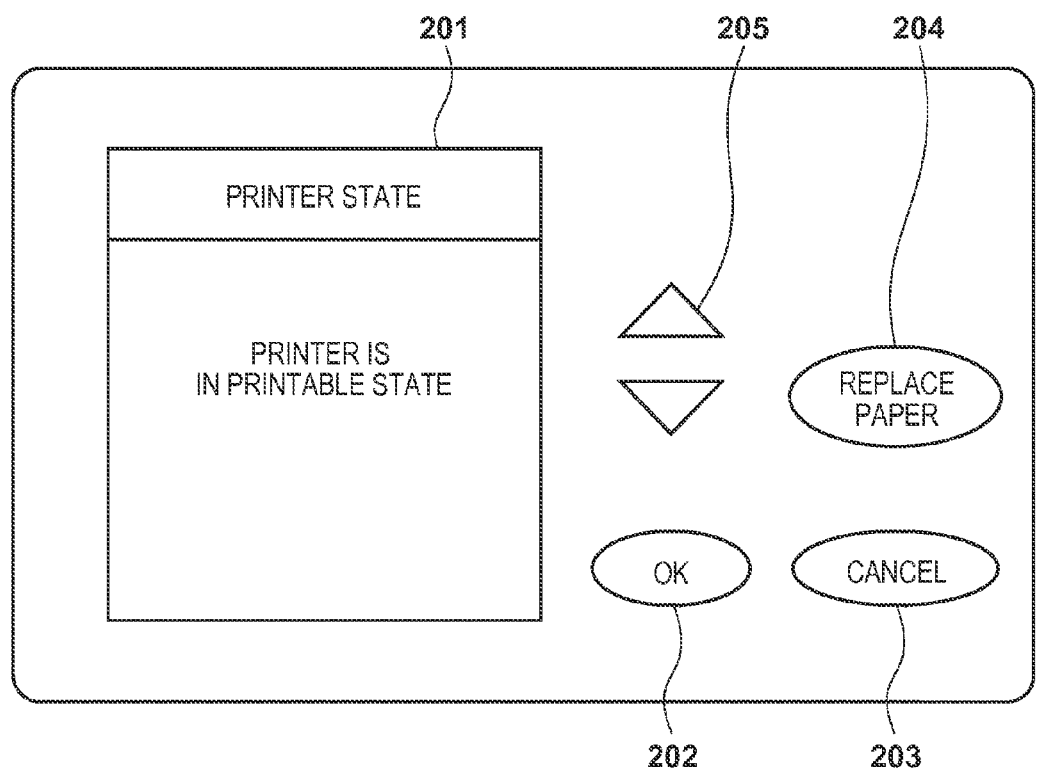
FIG. 2 is a view showing an example of a display unit and input unit.

FIG. 2 is a view showing an example of the display unit 141 and the input unit 142. A panel 201 is equivalent to the display unit 141 and, for example, a liquid crystal panel is used. As shown in FIG. 2, the panel 201 displays the print processing status of each print job, a setting screen for making various print settings, and the like under the control of the CPU 146. A key 202 is pressed when, for example, the user finalizes setting items on the setting screen. A key 203 is pressed when the user cancels a setting operation performed on the setting screen. A key 204 is pressed when the user replaces paper currently fed by the paper feed unit 144. Paper is replaced when, for example, at the time of executing a print job (to be also called a suspended job) temporarily suspended in the print job queue 143, the user wants to replace currently fed paper with paper corresponding to a paper type set in the print job. The suspended job is, for example, a print job, execution of which is temporarily suspended in the print job queue 143 because the paper type of paper set in the printing apparatus 140 and a paper type set in the print job are different (so-called mismatch). A key 205 is a vertical scroll key, and the user can vertically scroll and display a plurality of selection items displayed on the panel 201.

The CPU 146 can input a user instruction in accordance with operations of the user to these keys. The CPU 146 controls each unit of the printing apparatus 140 in accordance with the user instruction. Note that the input unit 142 is not limited to a key and may be a touch panel.

Figure 3:
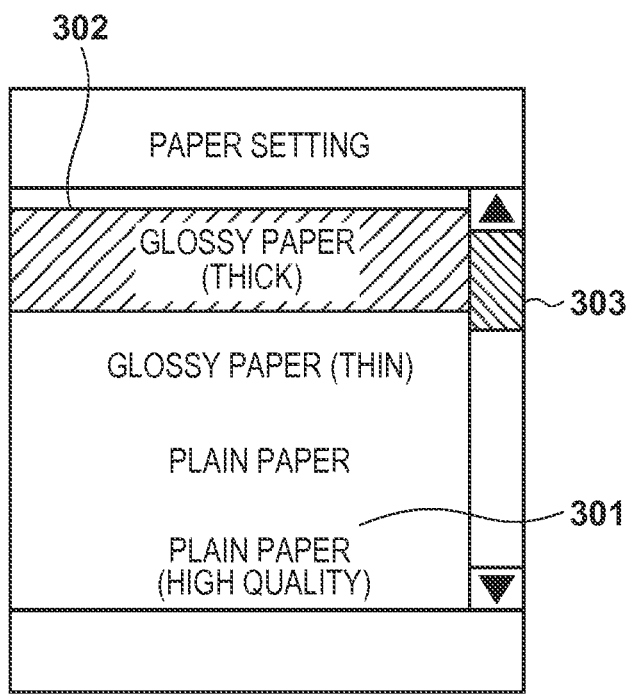
FIG. 3 is a view showing a paper type selection screen in the case of normal paper replacement.

FIG. 3 is a view showing a selection screen displayed on the panel 201. A selection screen 301 in FIG. 3 appears when the key 204 is pressed, and the user can select a replacement target paper type. An indication 302 is a display for emphasizing an item selected by the user. A scroll bar 303 is vertically moved by the operation of the key 205, and the selection screen 301 can be scrolled and displayed by this movement.

To obtain a proper printing result by executing a print job, a paper type set in a print job and the type of paper fed to the printing apparatus 140 need to match each other. For this purpose, the user searches for and selects a paper type he wants, on the selection screen 301. However, particularly when the printing apparatus 140 is a large-format printer, the printing apparatus 140 can generally support several ten types of paper. In this embodiment, therefore, when the user replaces paper, the paper type of the latest suspended job is preferentially displayed so that the user can easily select this paper type.

Figure 4:
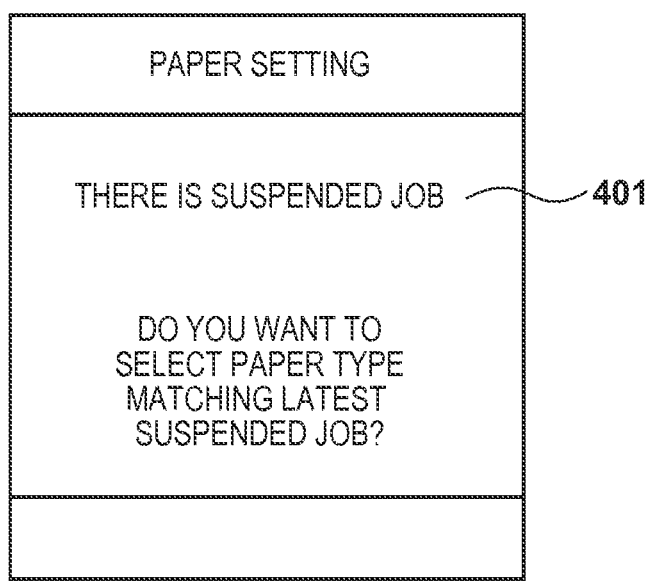
FIG. 4 is a view showing a notification screen displayed when there is a suspended print job.

FIG. 4 shows an example of a screen displayed on the panel 201 when a print job suspended owing to a paper type mismatch exists in the print job queue 143 upon pressing the key 204. A notification screen 401 notifies the user that the suspended job exists in the print job queue 143, and outputs a message to prompt the user to select whether to select a paper type matching the latest suspended job. The user presses the key 202 when he selects a paper type matching the latest suspended job in accordance with this notification.

Figure 6:
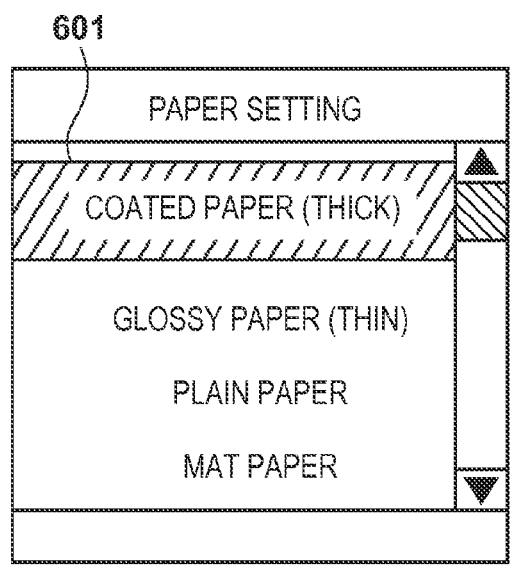
FIG. 6 is a view showing a selection screen displayed when performing paper replacement.
Figure 7:
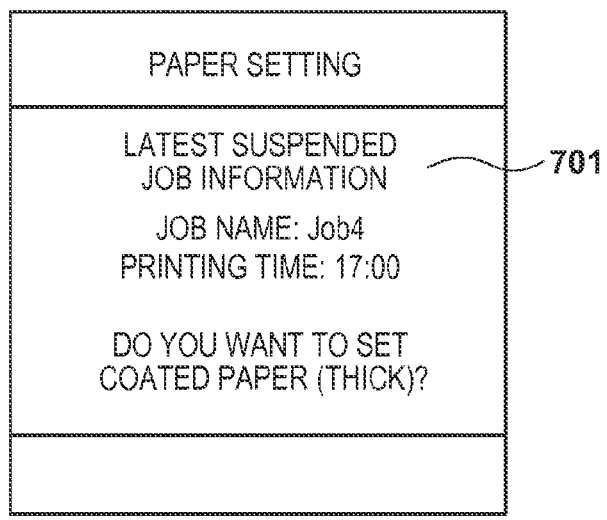
FIG. 7 is a view showing another example of a selection screen displayed when performing paper replacement.

FIGS. 6 and 7 are views showing examples of a selection screen displayed when the user presses the key 202 in accordance with the notification of FIG. 4. FIG. 5 is a table showing an example of a list of print jobs stored in the print job queue 143.

As shown in FIG. 5, a print job is managed by the items of an input order, job name, paper type, owner, status, and input time. The input order represents an order in which each print job has been input to the printing apparatus 140 and stored in the print job queue 143. The job name represents the job name of each print job. The paper type represents a paper type (designated by the printer driver) set in each print job. The owner represents the name of a user who has input each print job to the printing apparatus 140. In FIG. 5, for example, a PC name is displayed as the user name. The status represents the state of each print job, and all states in FIG. 5 are "suspended". The status includes "waiting for processing", "during printing", and "end of printing", in addition to "suspended". The input time represents the time when each print job was input to the printing apparatus 140. As shown in FIG. 5, each print job is managed in the order of the input time.

FIG. 6 is a view showing an example of a selection screen displayed on the panel 201 when the key 202 is pressed in accordance with the notification screen of FIG. 4 in the state of the print job queue 143 shown in FIG. 5. As represented by an indication 601 in FIG. 6, a suspended job of the latest input time, that is, "coated paper (thick)" set in "Job4" of FIG. 5 is arranged at the top of the list and emphasized. It is considered that a paper type is often replaced when a print job input by the user is temporarily suspended owing to a paper type mismatch and the print job is executed immediately. At this time, the selection screen is displayed as shown in FIG. 6, so the burden of search from several ten paper types by the user can be reduced. By scrolling, the display screen in FIG. 6 can display all paper types supported by the printing apparatus 140. As the alignment order on the list, paper types (four types corresponding to Job1 to Job4 in FIG. 6) corresponding to suspended jobs are displayed at the top of the list. For example, even if the user does not select "coated paper (thick)" set in "Job4", he can easily select a type corresponding to another suspended job.

FIG. 7 is a view showing an example of another notification screen displayed on the panel 201 when the key 202 is pressed in accordance with the notification screen of FIG. 4 in the state of the print job queue 143 shown in FIG. 5. In this embodiment, the notification screen shown in FIG. 7 may be displayed instead of displaying the screen of FIG. 6. As shown in FIG. 7, pieces of information of a suspended job of the latest input time, that is, "Job4" in FIG. 5 are displayed. Also, a message that prompts the user to select whether to select a paper type set in the job, that is, "coated paper (thick)" is displayed. By pressing the key 202, the user can easily decide a type of paper to be fed to the printing apparatus 140.

Figure 8:
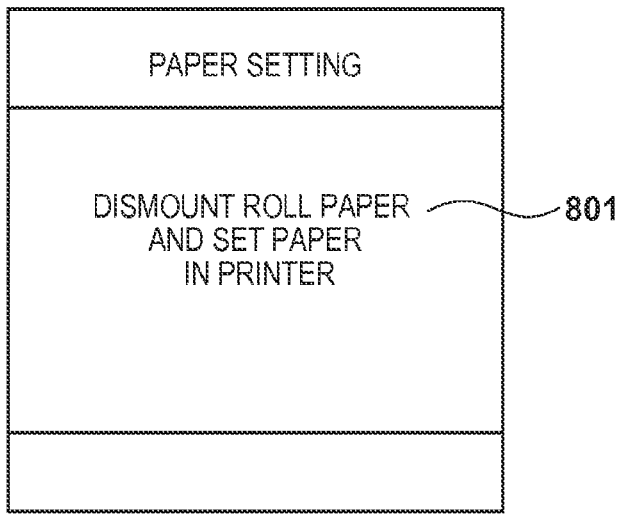
FIG. 8 is a view showing a notification screen displayed after selecting a paper type.

FIG. 8 is a view showing an example of a notification screen displayed on the panel 201 when the user selects a paper type on the selection screen of FIG. 3, 6, or 7 and presses the key 202. As represented by a notification screen 801, the user is notified to dismount roll paper currently set in the printing apparatus 140, and set printing paper of a selected paper type.

Figure 9:
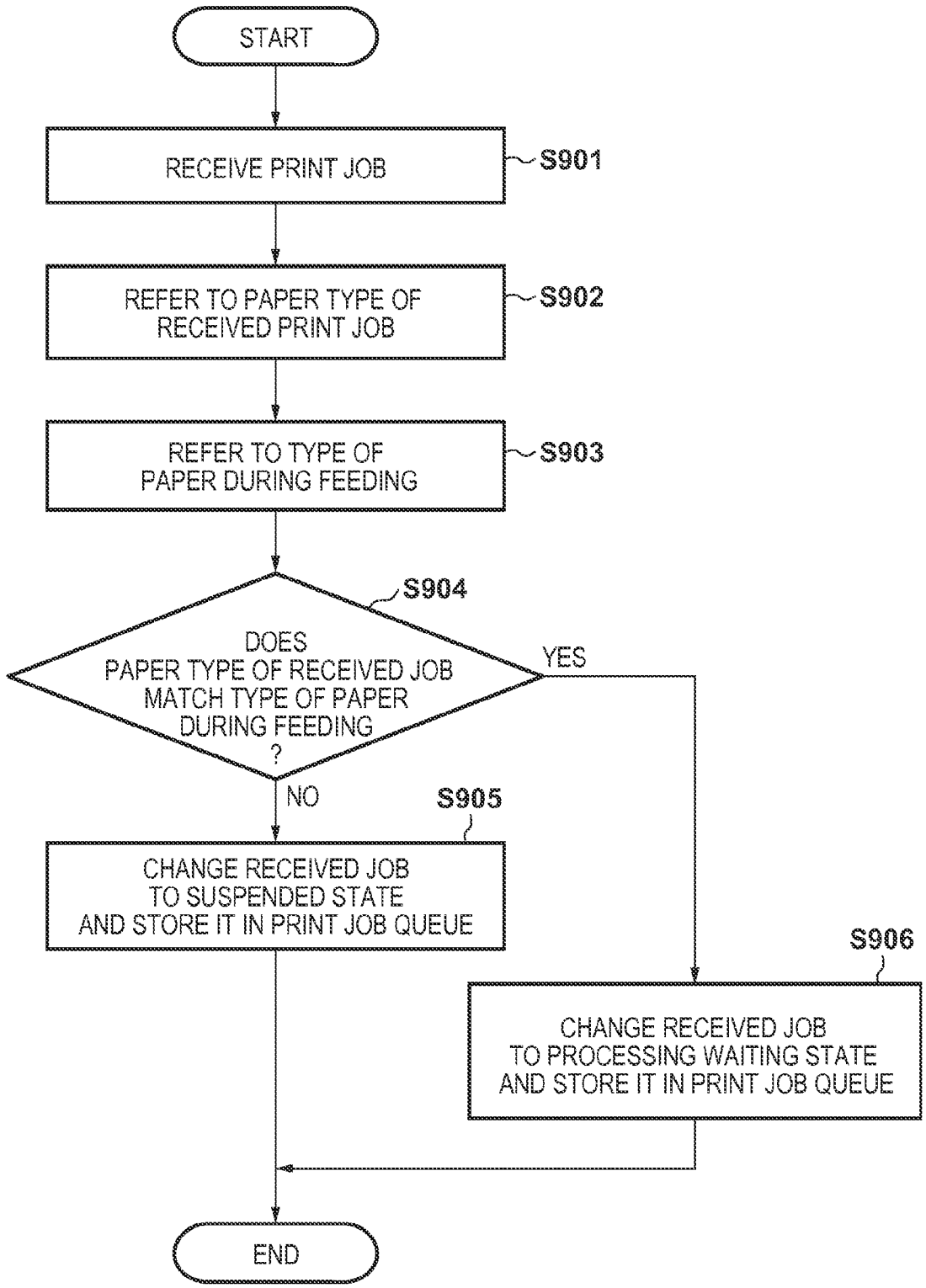
FIG. 9 is a flowchart showing the procedures of queue storage processing.

FIG. 9 is a flowchart showing the procedures of queue storage processing to be performed when the printing apparatus 140 receives and acquires a print job from the PC 110 or 120. Each process shown in FIG. 9 is implemented when, for example, the CPU 146 reads out a program from the ROM and executes it on the RAM. Assume that printing paper of a paper type "semi-glossy paper" is set in the paper feed unit 144 of the printing apparatus 140, and "Job4" is received from the PC 120 in this state. Also, assume that Job1 to Job3 in FIG. 5 have already been received from the PC 110 and stored in the print job queue 143 at that time.

In step S901, the CPU 146 receives and acquires a print job from the PC 110 or 120 via the network 130 (job acquisition). For example, Job4 is received from the PC 120. In step S902, the CPU 146 analyzes the print job received in step S901, and acquires the paper type of printing paper designated by the printer driver of the PC 110 or 120. For example, Job4 received from the PC 120 is analyzed to acquire the paper type "coated paper (thick)". In step S903, the CPU 146 acquires the paper type of printing paper currently fed by the paper feed unit 144. For example, the paper type "semi-glossy paper" is acquired. Note that information representing a currently fed paper type is stored in the ROM of the printing apparatus 140 by processing to be described later. In step S903, this information in the ROM is acquired.

In step S904, it is determined whether the paper type acquired in step S902 and the paper type acquired in step S903 match each other. If it is determined that these paper types match each other, the process advances to step S906. If it is determined that these paper types do not match each other, the process advances to step S905. For example, it is determined that the paper types "semi-glossy paper" and "coated paper (thick)" do not match each other. In this case, the process advances to step S905. Since execution of the print job received in step S901 fails owing to the paper type mismatch, the print job is changed to the "suspended" state and stored in the print job queue 143 on standby for execution in step S905. For example, Job4 received in step S901 is stored in the print job queue 143. As a result, the state of the print job queue 143 changes to the state shown in FIG. 5. To the contrary, in step S906, the print job received in step S901 is changed to the "waiting for processing" state and stored in the print job queue 143.

Note that the CPU 146 steadily monitors the print job queue 143, executes print processing in accordance with the print job that has been stored in the print job queue 143 in step S906 and is in the "waiting for processing" state, and controls the printing unit 145 to print data included in the print job. When a plurality of print jobs in the "waiting for processing" state are stored, print processing is executed sequentially from a print job of earlier input time. The CPU 146 does not execute print processing for a print job in the "suspended" state. However, when paper is replaced by processing to be described later, the CPU 146 determines whether a print job that is in the "suspended" state and corresponds to a paper type after the replacement exists in the print job queue 143. If such a print job exists, print processing is executed. When there are a plurality of print jobs that are in the "suspended" state and correspond to a paper type after the replacement, print processing is executed sequentially from a print job of earlier input time.

Figure 10:
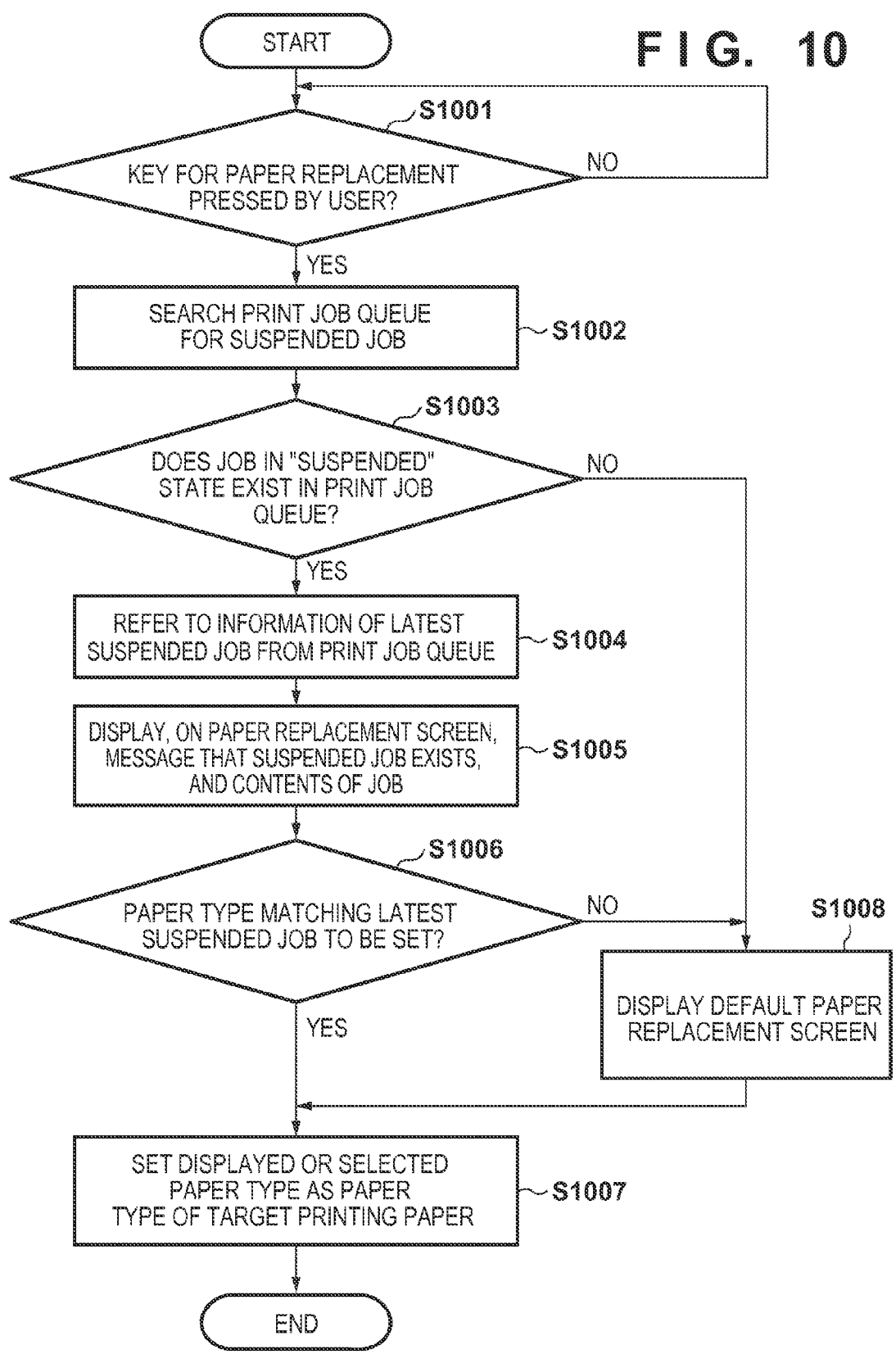
FIG. 10 is a flowchart showing the procedures of display control processing.

FIG. 10 is a flowchart showing the procedures of display control processing to be performed when the key 204 is pressed. Each process shown in FIG. 10 is implemented when, for example, the CPU constituting the controlling unit of the printing unit 145 reads out a program from the ROM and executes it on the RAM. In this embodiment, a case will be explained, in which the print job queue 143 is in a state as shown in FIG. 5 and the key 204 is pressed to display the screen of FIG. 7.

In step S1001, it is determined whether the user has pressed the key 204 for a paper replacement instruction. For example, when the user wants to replace the type of paper currently fed to the printing apparatus 140, he presses the key 204. If it is determined in step S1001 that the key 204 has been pressed (YES in step S1001), the process advances to step S1002. If it is not determined that the key 204 has been pressed (NO in step S1001), the determination in step S1001 is performed again.

In step S1002, the CPU 146 searches the print job queue 143 for a print job (suspended job) in the "suspended" status. For example, four print jobs Job1, Job2, Job3, and Job4 shown in FIG. 5 are detected from the print job queue 143 as a result of the processing in step S1002.

In step S1003, it is determined whether a suspended job has been detected in step S1002. If it is determined that a suspended job has been detected, the process advances to step S1004. If it is determined that no suspended job has been detected, the process advances to step S1008. In step S1008, the paper selection screen shown in FIG. 3 is displayed on the panel 201 of the display unit 141. As described with reference to FIG. 3, the type "glossy paper (thick)" of paper currently fed to the printing apparatus 140 is emphasized on the selection screen 301. After the processing in step S1008, the processing in FIG. 10 ends.

In step S1004, the CPU 146 acquires information about the latest suspended job from the print job queue 143. At this time, pieces of information of Job4 in FIG. 5, that is, pieces of information of the input order, job name, paper type, owner, status, and input time are acquired. In step S1005, the notification screen shown in FIG. 7 is displayed on the panel 201 of the display unit 141 based on the pieces of information acquired in step S1004. As shown in FIG. 7, the job name and input time (printing time) are displayed based on the pieces of information of Job4 of the latest input time. In addition, a message that prompts the user to select whether to set the paper type "coated paper (thick)" of Job4 in the paper feed unit 144 is also displayed. If the user is to set "coated paper (thick)" in accordance with this message, he presses the key 202 (OK key). If the user is not to set "coated paper (thick)", he presses the key 203 (cancel key).

In step S1006, it is determined which of the keys 202 and 203 has been pressed by the user on the display of the notification screen in FIG. 4. If it is determined that the key 202 has been pressed, the process advances to step S1007. If it is determined that the key 203 has been pressed, the process advances to step S1008.

If YES in step S1006, the screen shown in FIG. 6 or the screen shown in FIG. 7 is displayed. If the user presses the key 202 in either of these screens, processing in step S1007 is executed. If the user presses the key 203 in the screen of FIG. 6 or 7, the process may advance to step S1008 to display the default selection screen shown in FIG. 3.

The paper type displayed in the screen shown in FIG. 6 or 7 in step S1007, or the paper type selected in the selection screen of FIG. 3 displayed in step S1008 is set as the paper type of target printing paper. More specifically, the CPU 146 stores, in the ROM, information representing the paper type. In step S903 of FIG. 9 described above, this information is acquired as the type of paper currently set in the printing apparatus 140. In step S1007, the notification screen of FIG. 8 is displayed, and the processing in FIG. 10 ends.

If it is determined in step S1001 that the key 204 for a paper replacement instruction has been pressed, the CPU 146 controls the paper feed unit 144 to execute a roll paper take-up operation. By this operation, a portion fed to the printing unit 145 can be taken up. Then, the user replaces paper by dismounting the roll paper after take-up from the printing apparatus 140 and setting new roll paper. In the printing apparatus 140, a sensor may be arranged at a paper mounting portion to detect that the user has set roll paper.

Figure 11:
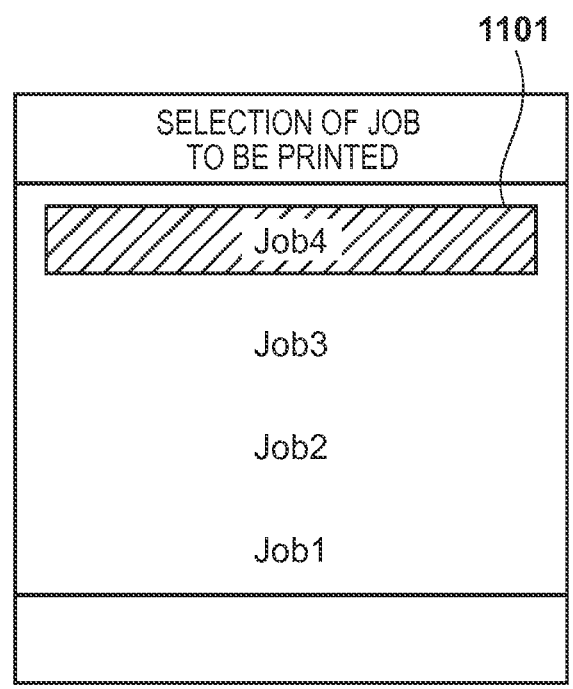
FIG. 11 is a view showing a print job selection screen.

FIG. 11 is a view showing an example of a print job selection screen displayed when the user executes a print job suspended in the print job queue 143. The print job is executed after the processing in step S1007 of FIG. 10. For example, a screen in FIG. 11 may appear when the end of paper replacement by the user is detected after displaying the notification screen of FIG. 8 in step S1007. A job selection screen 1101 in FIG. 11 appears when, for example, the user presses the printing start button of the input unit 142 of the printing apparatus 140 or inputs an instruction on a print job execution screen displayed on the panel 201.

As shown in FIG. 11, the job selection screen 1101 displays, in the input time order, print jobs suspended in the print job queue 143. For example, in FIG. 11, print job Job4 of the latest input time, out of the print jobs shown in FIG. 5, is preferentially displayed at the top. By this display method, when a print job transmitted in advance to the printer by the user using the PC is suspended owing to a paper type mismatch and printing is to be executed immediately, this print job is displayed as a print candidate at the top, as shown in FIG. 11. Especially when the number of print jobs to be displayed is large, the user can easily designate a print job he wants, improving user friendliness. For example, when the user presses the OK key and designates "coated paper (thick)" as a paper type corresponding to the latest suspended job while the screen shown in FIG. 7 is displayed, paper corresponding to "coated paper (thick)" designated by Job4 has already been set in the paper feed unit 144 of the printing apparatus 140. In this case, Job4 should be designated as a print job, printing of which is executed. Since Job4 is preferentially displayed in the screen of FIG. 11, Job4 can be easily designated.

Even when the printing apparatus 140 supports many paper types, the above-described arrangement improves user friendliness regarding paper replacement when printing the latest suspended job. Although paper types have been explained as a plurality of types of paper qualities such as glossy paper and coated paper in this embodiment, they may be a plurality of types of paper sizes such as A3 size and A4 size.

In the above-described embodiment, a paper type corresponding to the latest suspended job is preferentially displayed as a paper type candidate after paper replacement in the screens described with reference to FIGS. 6 and 7, but the present invention is not limited to this. For example, a paper type corresponding to the earliest input suspended job may be preferentially displayed. Alternatively, a paper type designated by the largest number of suspended jobs among a plurality of suspended jobs may be preferentially displayed.

Further, paper type candidates after paper replacement in the screen of FIG. 6 may be limited to paper types corresponding to suspended jobs. When a suspended job is stored at the time of paper replacement, a paper type corresponding to the suspended job is highly likely to be selected. For this reason, the candidates are limited to paper types corresponding to suspended jobs, and a paper type corresponding to a suspended job that satisfies a predetermined condition (for example, "latest") is preferentially displayed. Even when the user selects a paper type corresponding to a suspended job that is not latest, he can easily select this paper type.

Note that the aforementioned candidates may not be limited to paper types corresponding to suspended jobs. For example, it is also possible to display all paper types, and emphasize (for example, color in light gray) paper types corresponding to suspended jobs as the candidates. Further, a paper type corresponding to a suspended job that satisfies a predetermined condition (for example, "latest") may be emphasized much more (for example, colored in dark gray). By this setting, the user can more easily select a proper paper type.

As the use method of a paper type after paper replacement, the above embodiment has exemplified matching processing with a paper type designated by a print job. However, for example, when no paper type is designated by a print job, printing corresponding to a paper type after paper replacement may be executed.

Also, the above embodiment has exemplified a paper type (for example, paper material) as a paper attribute set in a print job or the printing apparatus. However, the present invention is not limited to this, and the paper attribute may be a paper size.

Further, as a suspended job, the above embodiment has exemplified a print job, printing of which has been suspended owing to a paper type mismatch. However, the present invention is not limited to this, and the suspended job suffices to be a print job that has been stored in the print job queue before paper replacement. For example, when paper runs out, printing of a print job is suspended. A job suspended in this manner may be the suspended job described in the above embodiment. Even in this case, a paper type designated by the suspended job stored in the print job queue is highly likely to be a paper type after replacement. Thus, a paper type after paper replacement may be specified based on such a suspended job.

The above embodiment has exemplified a CPU in the printing apparatus as the print controlling apparatus that specifies a paper type after paper replacement, but the present invention is not limited to this. For example, a host PC or print server that is connected to a printing apparatus and transmits a print job to the printing apparatus may operate as the print controlling apparatus in this embodiment. In this case, a paper type before replacement that is set in the printing apparatus is sent from the printing apparatus to the host PC or the print server. In addition, the host PC or print server manages a print job transmitted to the printing apparatus, and paper type matching processing (step S904) between a print job and the printing apparatus, and specifying (step S905) of a suspended job can be implemented. Accordingly, the host PC or the print server can serve as the print controlling apparatus and implement specifying of a paper type after paper replacement in this embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Program codes for implementing the functions of this embodiment may be executed by one computer (CPU or MPU) or executed by a plurality of computers in cooperation. Further, a computer may execute the program codes, or hardware such as a circuit for implementing the functions of the program codes may be arranged. Alternatively, some of the program codes may be implemented by hardware and the remaining program codes may be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-019766, filed Feb. 4, 2014, which is hereby incorporated by reference herein in its entirety.

What is claimed is:

1. A print controlling apparatus that controls a printing apparatus capable of executing printing corresponding to each of a plurality of types of attributes of printing paper, comprising:
   an acquisition unit configured to acquire a paper attribute designated by a suspended job which has been stored in a print job queue and printing of which has not been executed;
   a display controlling unit configured to, in a case where executing replacement of paper supplied to the printing apparatus is executed, control a display unit to display a screen in which a user can designate a paper attribute candidate after paper replacement, so that the paper attribute acquired by said acquisition unit is preferentially displayed out of candidates which the user can select as the paper attribute candidate; and
   a print controlling unit configured to control the printing apparatus to print an image on printing paper after the replacement, based on a paper attribute designated by the user in the screen displayed by the display controlling unit.

2. The apparatus according to claim 1,
   Wherein said display controlling unit controls the display unit to display the screen including the candidates which the user can select as the paper attribute candidate, so that the paper attribute acquired by said acquisition unit is preferentially displayed.

3. The apparatus according to claim 2, wherein said display controlling unit controls the display unit to display the screen indicating a list including the candidates, so that the paper attribute acquired by said acquisition unit is preferentially displayed in an order of the list.

4. The apparatus according to claim 1, further comprising an acceptance unit configured to accept a replacement instruction from a user in order to perform the paper replacement,
   Wherein, in a case where said acceptance unit accepts the replacement instruction, said display controlling unit controls the display unit to display the screen.

5. The apparatus according to claim 1, further comprising:
   a job acquisition unit configured to acquire a print job; and
   a determination unit configured to determine whether printing corresponding to the print job acquired by said job acquisition unit has been executed,
   wherein said acquisition unit regards, as the suspended job, a print job which has been acquired by said job acquisition unit and printing of which is determined by said determination unit not to have been executed, and acquires a paper attribute corresponding to the suspended job.

6. The apparatus according to claim 5, wherein said print controlling unit controls the printing apparatus to print the image on printing paper after the replacement based on the print job on condition that a paper attribute designated by a print job acquired by said job acquisition unit and the designated paper attribute match each other, and
   in accordance with whether said print controlling unit has executed printing, said determination unit determines whether the print job has been executed.

7. The apparatus according to claim 1, wherein in a case where a plurality of suspended jobs exist, the suspended job is a suspended job satisfying a predetermined condition, out of the plurality of suspended jobs.

8. The apparatus according to claim 7, wherein the suspended job satisfying the predetermined condition is a suspended job that has been stored last in the print job queue, out of the plurality of suspended jobs.

9. The apparatus according to claim 1, wherein the print job queue is a predetermined storage area in the printing apparatus.

10. The apparatus according to claim 1, wherein the print controlling apparatus includes the printing apparatus.

11. The apparatus according to claim 1, wherein the paper attribute includes one of a paper type and a paper size.

12. A print controlling method of controlling a printing apparatus capable of executing printing corresponding to each of a plurality of types of attributes of printing paper, comprising:
an acquisition step of acquiring a paper attribute designated by a suspended job which has been stored in a print job queue and printing of which has not been executed;
a display controlling step of, in a case where replacement of paper supplied to the printing apparatus is executed, controlling a display unit to display a screen in which a user can designate a paper attribute candidate after paper replacement, so that the paper attribute acquired in said acquisition step is preferentially displayed out of candidates which the user can select as the paper attribute candidate; and
a print controlling step of controlling the printing apparatus to print an image on printing paper after the replacement, based on a paper attribute designated by the user in the screen displayed by the display controlling unit.

13. The method according to claim 12,
wherein said display controlling step controls the display unit to display the screen including the candidates which the user can select as the paper attribute candidate, so that the paper attribute acquired in said acquisition step is preferentially displayed.

14. The method according to claim 13, wherein said display controlling step controls the display unit to display the screen indicating a list including the candidates, so that the paper attribute acquired in said acquisition step is preferentially displayed in an order of the list.

15. The method according to claim 12, further comprising an acceptance step of accepting a replacement instruction from a user in order to perform the paper replacement,
wherein, in a case where said acceptance step accepts the replacement instruction, said display controlling step controls the display unit to display the screen.

16. The method according to claim 12, further comprising:
a job acquisition unit step of acquiring a print job; and
a determination step of determining whether printing corresponding to the print job acquired in said job acquisition step has been executed,
wherein said acquisition step regards, as the suspended job, a print job which has been acquired in said job acquisition step and printing of which is determined in said determination step not to have been executed, and acquires a paper attribute corresponding to the suspended job.

17. The method according to claim 16, wherein said print controlling step controls the printing apparatus to print the image on printing paper after the replacement based on the print job on condition that a paper attribute designated by a print job acquired in said job acquisition step and the designated paper attribute match each other, and
in accordance with whether said print controlling step has executed printing, said determination step determines whether the print job has been executed.

18. The method according to claim 12, wherein in a case where a plurality of suspended jobs exist, the suspended job is a suspended job satisfying a predetermined condition, out of the plurality of suspended jobs.

19. The method according to claim 18, wherein the suspended job satisfying the predetermined condition is a suspended job that has been stored last in the print job queue, out of the plurality of suspended jobs.

20. The method according to claim 12, wherein the paper attribute includes one of a paper type and a paper size.

21. A non-transitory computer-readable storage medium storing a program for causing a computer to execute a print controlling method defined in claim 12.

* * * * *